United States Patent
Yamada et al.

(10) Patent No.: US 9,764,308 B2
(45) Date of Patent: Sep. 19, 2017

(54) OXYGEN-ABSORBING RESIN COMPOSITION

(75) Inventors: Toshiki Yamada, Kanagawa (JP); Yukiko Hirayama, Kanagawa (JP); Yoshiki Sawa, Kanagawa (JP)

(73) Assignee: TOYO SEIKAN GROUP HOLDINGS, LTD., Tokyo (JP)

( * ) Notice: Subject to any disclaimer, the term of this patent is extended or adjusted under 35 U.S.C. 154(b) by 0 days.

(21) Appl. No.: 13/978,048

(22) PCT Filed: Jan. 12, 2012

(86) PCT No.: PCT/JP2012/050447
§ 371 (c)(1),
(2), (4) Date: Jul. 2, 2013

(87) PCT Pub. No.: WO2012/102086
PCT Pub. Date: Aug. 2, 2012

(65) Prior Publication Data
US 2013/0284617 A1    Oct. 31, 2013

(30) Foreign Application Priority Data
Jan. 27, 2011 (JP) ................. 2011-014844

(51) Int. Cl.
| | | |
|---|---|---|
| *B01J 20/26* | (2006.01) | |
| *B01D 53/02* | (2006.01) | |
| *B65D 81/26* | (2006.01) | |
| *C08L 67/02* | (2006.01) | |
| *C08L 77/06* | (2006.01) | |
| *B01J 20/22* | (2006.01) | |
| *B01J 20/30* | (2006.01) | |
| *B01J 20/28* | (2006.01) | |

(52) U.S. Cl.
CPC ............ *B01J 20/261* (2013.01); *B01D 53/02* (2013.01); *B01J 20/22* (2013.01); *B01J 20/262* (2013.01); *B01J 20/28052* (2013.01); *B01J 20/3007* (2013.01); *B01J 20/3014* (2013.01); *B65D 81/266* (2013.01); *B65D 81/267* (2013.01); *C08L 67/02* (2013.01); *C08L 77/06* (2013.01); *B01D 2251/10* (2013.01); *B01D 2253/202* (2013.01); *B01D 2257/104* (2013.01); *B01J 2220/44* (2013.01); *C08K 2201/012* (2013.01)

(58) Field of Classification Search
CPC .............. C08K 5/1535; C08K 5/1539; C08K 2201/012; D65D 81/267; C07D 209/48; C07D 403/02; C07D 403/04
USPC .......... 206/205; 428/35.2, 35.7, 36.8, 36.9, 428/36.91, 36.92; 252/188.25; 548/460, 548/461; 549/295; 524/86, 87, 89, 94, 524/210, 219
See application file for complete search history.

(56) References Cited

U.S. PATENT DOCUMENTS

| | | | | |
|---|---|---|---|---|
| 3,557,132 A | * | 1/1971 | Kurl-Heinz ......... | C08K 5/3415 524/102 |
| 4,367,314 A | | 1/1983 | Kageyama et al. | |
| 5,804,236 A | * | 9/1998 | Frisk .................. | B65D 1/0215 252/181.3 |
| 6,689,437 B1 | * | 2/2004 | Ubara ................ | B65D 81/266 252/188.28 |
| 7,696,300 B2 | | 4/2010 | Ohta et al. | |
| 7,842,361 B2 | | 11/2010 | Ohta et al. | |
| 8,293,346 B2 | | 10/2012 | Kitahara et al. | |
| 8,293,373 B2 | | 10/2012 | Kitahara et al. | |
| 2001/0034419 A1 | * | 10/2001 | Kanayama ......... | C08L 69/00 525/439 |
| 2002/0002238 A1 | * | 1/2002 | Laplante et al. .......... | 525/50 |
| 2005/0142373 A1 | | 6/2005 | Komatsu et al. | |
| 2006/0116452 A1 | * | 6/2006 | Tsuji ................... | B01J 20/22 524/104 |
| 2007/0036923 A1 | * | 2/2007 | Ishizaki et al. ......... | 428/34.1 |
| 2009/0061249 A1 | | 3/2009 | Kitahara et al. | |
| 2009/0098323 A1 | * | 4/2009 | Ohta et al. ............. | 428/35.7 |
| 2010/0126899 A1 | | 5/2010 | Kitahara | |
| 2011/0275742 A1 | * | 11/2011 | Akkapeddi .......... | C08K 5/3415 524/89 |

FOREIGN PATENT DOCUMENTS

| | | | | |
|---|---|---|---|---|
| CN | 1654536 | | 8/2005 | |
| CN | 1950424 | | 4/2007 | |
| JP | EP 1055654 A1 | * | 11/2000 | ......... B01J 31/0247 |
| JP | 2003-521552 | | 7/2003 | |
| JP | 2004-161796 | | 6/2004 | |
| JP | 2005-230756 | | 9/2005 | |
| JP | 2008-38126 | | 2/2008 | |
| JP | 2009-12443 | | 1/2009 | |
| JP | 4314637 | | 5/2009 | |
| WO | 99/48963 | | 9/1999 | |
| WO | 2006/101020 | | 9/2006 | |
| WO | 2008/102701 | | 8/2008 | |

OTHER PUBLICATIONS

International Search Report issued in PCT/JP2012/050447 on Feb. 28, 2012 in English.
Chinese Office Action, dated Mar. 31, 2014, in corresponding Chinese Patent Application No. 201280006841.2, along with an English translation thereof.
Extended European Search Report issued in Application No. 12739325.4, dated Jan. 3, 2017.

* cited by examiner

*Primary Examiner* — Lee E Sanderson
(74) *Attorney, Agent, or Firm* — Greenblum & Bernstein, P.L.C.

(57) ABSTRACT

To provide an oxygen-absorbing polyester resin composition which exhibits excellent oxygen-absorbing capability even in the absence of transition metal catalyst without affected by the glass transition temperature of a polyester resin that is contained as a base resin.
The oxygen-absorbing polyester resin composition including a base resin (A) which is a polyester resin, an oxygen-absorbing component (B) which is a compound having an unsaturated alicyclic structure, and an oxidation promotion component (C) for promoting the oxidation of the oxygen-absorbing component (B), said oxidation promotion component (C) being a compound having a benzyl hydrogen.

3 Claims, No Drawings

US 9,764,308 B2

OXYGEN-ABSORBING RESIN COMPOSITION

TECHNICAL FIELD

This invention relates to a resin composition that features excellent oxygen-absorbing capability containing a thermoplastic resin and, specifically, a polyester resin as a base resin and, further, containing an oxygen-absorbing component. The invention, further, relates to packaging containers that include a layer formed from the above resin composition.

BACKGROUND ART

A thermoplastic resin, for example, a polyester resin as represented by polyethylene terephthalate (PET) excels in such properties as formability, transparency, mechanical strength and resistance against chemicals as well as relatively high barrier property against gases such as oxygen and the like, and has been used as a packaging material such as of film, sheet, bottle, etc. in a variety of fields. In order to improve gas-barrier property of the packaging material, further, there has been known a multilayer structure comprising a layer of a gas-barrier resin rich in gas-barrier property, such as a saponified product of ethylene-vinyl acetate copolymer or a polyamide as an intermediate layer sandwiched between an inner layer and an outer layer of a polyester resin via a suitable adhesive resin layer.

From the standpoint of saving resources and decreasing the weight of the packaging containers such as polyester bottles that have been placed in the market, attempts have been made to further decrease the thickness of the body portions. To meet the above requirement, further, it becomes necessary to suppress a decrease in the barrier property against the gases such as oxygen and the like caused by a reduction in the thickness, as a matter of course. In an embodiment that uses the gas-barrier resin, in this case, the container must be formed in a multiplicity of layers to shut off the permeation of gases making it difficult to decrease the thickness of the container to a sufficient degree.

Oxygen-barrier property can be improved by using an inorganic oxygen absorber such as iron powder. The oxygen absorber by itself undergoes oxidation to absorb oxygen; i.e., exhibits barrier property to shut off the permeation of oxygen upon absorbing oxygen causing, however, the resins to be colored. Therefore, the inorganic oxygen absorber is not used in the field of packaging where transparency is required. In the field of packaging, therefore, it is a general practice to use an organic oxygen absorber that does not cause resins to be colored.

A patent document 1, for example, proposes an oxygen-absorbing resin composition containing an oxidizing organic component (organic oxygen absorber) such as unmodified polybutadiene or maleic anhydride-modified polybutadiene.

Further, a patent document 2 proposes an oxygen-trapping composition containing a compound having an unsaturated alicyclic structure (cyclohexene structure) as an organic oxygen absorber.

For being oxidized, however, the above organic oxygen absorber requires a transition metal catalyst (e.g., cobalt or the like) which causes a variety of inconveniences. For example, the resin which is the base material is oxidized and deteriorated, too, permitting oxygen to permeate through the wall of the base resin and without, therefore, much improving barrier property against oxygen. Besides, the base resin that is oxidized and deteriorated brings about a decrease in the strength, too. Moreover, low-molecular decomposed products such as aldehyde and ketone are by-produced much, arousing such problems as the generation of offensive odor and a decrease in the property for retaining flavor of the contents. In the field of packaging, in particular, a decrease in the property for retaining flavor of the contents is a serious problem. When an organic oxygen absorber is used, therefore, it becomes necessary to employ a layer structure of which the resin layer blended with the organic oxygen absorber does not come in contact with the content in the container, i.e., to employ a multilayer structure. Therefore, the above-mentioned means is not suited for decreasing the thickness of the container wall.

A patent document 3 proposes a resin composition containing a resin that exhibits excellent oxygen-absorbing capability even under a condition where no transition metal catalyst is present. This proposal was made by the present applicant. Namely, the resin composition contains, as the oxygen-absorbing resin, a resin that contains a constituent unit derived from a compound having an unsaturated alicyclic structure, such as a $\Delta^3$-tetrahydrophthalic acid derivative obtained by the Diels-Alder reaction of a maleic anhydride with the diene. The oxygen-absorbing resin of this type is very reactive with oxygen, and not only exhibits excellent oxygen-absorbing capability even under a condition where no transition catalyst is present but also by-produces no low molecular decomposition product that becomes a cause of offensive odor. Therefore, the resin can be applied as a single-layer structure to the containers offering an advantage of realizing the containers having effectively reduced thickness and weight.

Here, upon adjusting the copolymer composition, the resin composition of the patent document 3 can be rendered to have a glass transition temperature which is lower than room temperature to improve oxygen-absorbing capability. If the above oxygen-absorbing structure is contained in a resin having a high glass transition temperature that is used for packaging containers, e.g., is contained in a polyester resin such as PET, however, it is not allowed to improve the oxygen-absorbing capability to a sufficient degree. That is, the above oxygen-absorbing resin has a glass transition temperature of −8° C. to 15° C. and in which the mobility of the molecules is very high in an atmosphere of room temperature; i.e., this mobility is one of the factors that produce excellent oxygen-absorbing capability. On the other hand, the polyester resin such as PET used in the field of packaging containers has a glass transition temperature of about 70° C. and, therefore, its mobility at room temperature is very low. Therefore, even if the above oxygen-absorbing resin having a low glass transition temperature is made present together with the polyester resin at room temperature, mobility of the molecules remains suppressed and, as a result, oxygen-absorbing capability cannot be produced to a sufficient degree. Further, the oxygen-absorbing resin composition having a low glass transition temperature makes it difficult to maintain the shape of the containers or the rigidity thereof. When used for forming the containers, therefore, the oxygen-absorbing resin composition is not used alone but is used together with other resins to form the containers in a composite multilayer structure. In fact, the patent document 3 is forwarding the study for realizing the composite multilayer containers but is not studying the realization of polyester containers comprising chiefly the PET.

Further, a patent document 4 proposed by the present applicant is disclosing an oxygen-absorbing resin composition of a polyolefin resin (A) obtained by polymerizing an olefin having 2 to 8 carbon atoms, blended with a resin (B) that works to trigger the oxidation of the resin (A) and a transition metal catalyst (C), and teaches the use of a styrenic polymer as the resin (B).

However, the above resin composition, too, necessitates the use of the transition metal catalyst, and is used for imparting oxygen-absorbing capability to the olefin resin, but is not applied to the polyester resin.

As described above, there has not been known yet any oxygen absorber that exhibits excellent oxygen-absorbing capability upon being added to a polyester resin (specifically, to a polyester resin of the packaging grade) without using transition metal catalyst.

PRIOR ART DOCUMENTS

Patent Documents

Patent document 1: JP-A-2004-161796
Patent document 2: JP-T-2003-521552
Patent document 3: JP-A-2008-38126
Patent document 4: Japanese Patent No. 4314637

OUTLINE OF THE INVENTION

Problems that the Invention is to Solve

It is, therefore, an object of the present invention to provide an oxygen-absorbing resin composition which exhibits excellent oxygen-absorbing capability even in the absence of transition metal catalyst without affected by the glass transition temperature of a thermoplastic resin that is contained as a base resin.

Another object of the present invention is to provide an oxygen-absorbing resin composition which does not produce low molecular decomposed products that could become a cause of offensive odor at the time of absorbing oxygen and, therefore, is capable of forming containers of a single-layer structure making itself very useful for realizing containers of a decreased thickness.

A further object of the present invention is to provide a packaging container having a layer formed by using the above oxygen-absorbing resin composition.

Means for Solving the Problems

According to the present invention, there is provided an oxygen-absorbing resin composition including a base resin (A) which is a thermoplastic resin, an oxygen-absorbing component (B) which is a compound having an unsaturated alicyclic structure, and an oxidation promotion component (C) for promoting the oxidation of said oxygen-absorbing component (B), said oxidation promotion component (C) being a compound having a benzyl hydrogen.

In the oxygen-absorbing resin composition of the present invention, it is desired that:

(1) The oxygen-absorbing component (B) is at least one selected from the group consisting of an acid anhydride represented by the following formula (1),

[Chemical 1]

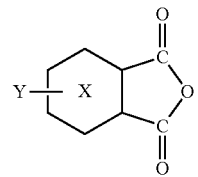

(1)

wherein the ring X is an aliphatic ring having an unsaturated bond, and Y is an alkyl group, an ester, an amide, an imide and a dicarboxylic acid derived from the acid anhydride, and a polymer having a constituent unit stemming from the acid anhydride;

(2) The base resin (A) is a polyester resin; and (3) The compound having a benzyl hydrogen is a styrenic polymer.

According to the present invention, further, there is provided a packaging container having, formed in the wall thereof, at least one layer that comprises the oxygen-absorbing resin composition.

The packaging container can employ an embodiment in which the layer that comprises the oxygen-absorbing resin composition is formed at a position where it comes in contact with the content in the container. Specifically, the packaging container can have a single-layer structure in which the container wall is formed by only a layer that comprises the oxygen-absorbing resin composition.

Effects of the Invention

In the present invention, an important feature resides in that the oxygen-absorbing resin composition contains a compound having an unsaturated alicyclic structure as an oxygen-absorbing component (B) (i.e., as an oxidizing component) and, further, uses a compound having a benzyl hydrogen as an oxidation promotion component (C) for promoting the oxidation of the oxygen-absorbing component (B).

Namely, in the resin composition of the present invention, the oxygen-absorbing component (B), upon coming in contact with oxygen, automatically undergoes the oxidation to absorb oxygen exhibiting excellent oxygen-absorbing capability that can be linked to exhibiting oxygen-barrier property. Here, in the composition containing the oxygen-absorbing component (B) or, concretely, having the unsaturated alicyclic structure described above, the unsaturatedly bonded portion in the aliphatic ring is cleaved. Therefore, there is by-produced no oxidized or decomposed product of a low molecular weight such as aldehyde or ketone. Besides, since the compound having the benzyl hydrogen has been added as the oxidation promoter component (C), automatic oxidation of the oxygen-absorbing component (B) is effectively promoted when it comes in contact with oxygen even in the absence of the transition metal catalyst, and excellent oxygen-absorbing capability is obtained. This suppresses the formation of by-products, i.e., low molecular decomposed products caused by the use of the transition metal catalyst and, further, effectively avoids a decrease in the strength or in the gas-barrier property caused by the oxidation and deterioration of the thermoplastic resin such as polyester resin used as the base resin (A).

Further, the oxidation promotion component (C) makes it possible to obtain excellent oxygen-absorbing capability even when the mobility of molecules of the oxygen-absorbing component (B) is suppressed at room temperature due to the use of, as the base resin (A), a thermoplastic resin of a packaging grade such as a polyester resin having a high glass transition temperature. Therefore, the oxygen-absorbing resin composition of the present invention can be effectively applied to forming packaging containers of a thermoplastic resin.

The resin composition containing a compound having the benzyl hydrogen, e.g., containing a styrenic polymer as the oxidation promotion component has heretofore been known as described in the patent document 4. However, quite no example has heretofore been known using the compound having the benzyl hydrogen (hereinafter often simply referred to as "benzyl compound") for promoting the oxidation of the compound that has an unsaturated alicyclic structure (hereinafter often simply referred to as "unsaturated alicyclically structured compound"). Besides, it is not quite expected from the prior art to realize excellent oxygen-absorbing capability even under the conditions where the mobility of the molecules is suppressed in the absence of the transition metal catalyst and at room temperature by making the benzyl compound and the unsaturated alicyclically structured compound present in the thermoplastic resin.

The patent document 4, for example, is using an olefin resin (having a low glass transition temperature and a high mobility of molecules at room temperature) obtained by polymerizing an olefin having 2 to 8 carbon atoms as a resin for promoting the oxidation with a benzyl compound (styrene polymer). Thus, the patent document 4 uses neither the unsaturated alicyclically structured compound nor the thermoplastic resin as the base resin. Besides, the patent document 4 necessitates the use of a transition metal catalyst. Namely, according to the prior art of the patent document 4, it is necessary to maintain the mobility of molecules at room temperature by using the transition metal catalyst in order to secure excellent oxygen-absorbing capability but it is quite out of expectation to attain excellent oxygen-absorbing capability in the absence of the transition metal catalyst at room temperature and under the condition where the mobility of the molecules is suppressed.

Through the results of extensive experiments, the present inventors have discovered, as a phenomenon, the fact that excellent oxygen-absorbing capability can be obtained in the absence of a transition metal catalyst at room temperature under the condition where the mobility of the molecules is suppressed if use is made of an unsaturated alicyclically structured compound as the oxygen-absorbing component (B) in combination with a benzyl compound as the oxidation promotion component (C). Though the reason has not been clarified yet, the present inventors speculate it as described below.

That is, the bond dissociation energy of the benzyl hydrogen possessed in the molecules of the benzyl compound used as the oxidation promotion component (C) is 309 kJ/mol which is very smaller than those of allyl hydrogen (323 kJ/mol), hydrogen (356 kJ/mol) of tertiary carbon and methylene hydrogen (415 kJ/mol) as shown by the following formulas.

[Chemical 2]

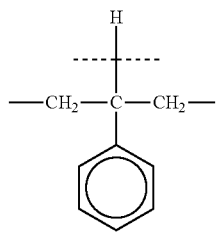

Benzyl hydrogen
309 kJ/mol

[Chemical 3]

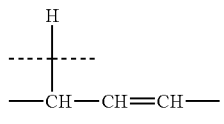

Allyl hydrogen
323 kJ/mol

[Chemical 4]

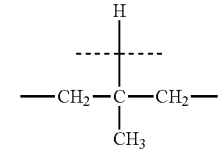

Hydrogen of tertiary carbon
356 kJ/mol

[Chemical 5]

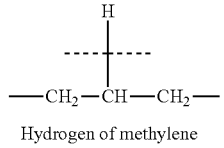

Hydrogen of methylene
415 kJ/mol

It is, therefore, considered that the benzyl hydrogen possessed by the benzyl compound is easily pulled out in the step of producing the resin composition to generate a radical that serves to form a radical source. Thus, radicals are fed to the unsaturated alicyclically structured compound of the oxygen-absorbing component (B) to promote the oxidation of the unsaturated alicyclically structured compound. In the present invention, however, the radical of the benzyl compound that is generated as the benzyl hydrogen is pulled out, does not easily bond to oxygen. Besides, the radicals are present in the thermoplastic resin such as the polyester having a higher oxygen-barrier property than that of the olefin resins. Therefore, the radicals of the benzyl compound are not oxidized and stably serve as a radical source. Moreover, the unsaturated alicyclically structured compound is subject to be very easily oxidized. Accordingly, the radicals of the benzyl compound are not consumed by oxidation but serve as the radical source to effectively form radicals of the unsaturated alicyclically structured compound. As a result, the unsaturated alicyclically structured compound automatically undergoes the oxidation more effectively upon coming in contact with oxygen even in the absence of the transition metal catalyst. Upon using the thermoplastic resin of a packaging grade having a high glass transition temperature as the base resin (A), further, oxidation of the unsaturated alicyclically structured compound is effectively promoted even under a condition where the mobility of the molecules is suppressed at room temperature. In either case, therefore, excellent oxygen-absorbing capability is expressed.

The oxygen-absorbing resin composition of the present invention can be used for forming packaging containers excelling in oxygen-barrier property without by-producing any low molecular decomposition products that could become a cause of offensive odor due to absorption of oxygen (oxidation) and a decrease in the flavor-retaining property. Therefore, a layer of the resin composition can be formed at a position where it comes in contact with the content in the container. Namely, since the formation of by-products such as oxidized and decomposed products of low molecular weights has been suppressed, the flavor of the content in the container is not spoiled despite the layer comes in contact with the content in the container.

Therefore, with the oxygen-barrier property being improved by forming the packaging container by using the oxygen-absorbing resin composition of the present invention, it is allowed to increase the degree of freedom for designing the container wall and to realize a multilayer structure by forming the layer of the oxygen-absorbing resin composition at any position as well as to form the container wall of a single-layer structure having the layer of the oxygen-absorbing resin composition only. Specifically, in the case of the container of the single-layer structure, too, oxygen-barrier property can be secured owing to its excellent oxygen-absorbing capability. Therefore, the oxygen-absorbing resin composition of the present invention is very advantageous for reducing the thickness and weight of the containers.

MODES FOR CARRYING OUT THE INVENTION

As will be understood from the above description, the oxygen-absorbing resin composition of the present invention comprises a base resin (A) (i.e., a resin component serving as a matrix) which is a thermoplastic resin and, most desirably, a polyester resin, as well as a predetermined oxygen-absorbing component (B) and an oxidation promotion component (C). As required, further, the oxygen-absorbing resin composition of the invention is blended with known blending agents that are used for the resin compositions of this kind.

<Base Resin (A)>

As the base resin (A), there can be used any thermoplastic resin so far as it is formable. As the base resin (A), for example, there can be used olefin resins such as low-density polyethylene, high-density polyethylene, polypropylene, poly 1-butene, poly 4-methyl-1-pentene, random or block copolymer of α-olefins, such as ethylene, propylene, 1-butene, 4-methyl-1-pentene, and cyclic olefin copolymer; ethylene-vinyl copolymers such as ethylene-vinyl acetate copolymer, ethylene-vinyl alcohol copolymer and ethylene-vinyl chloride copolymer; styrene resins such as polystyrene, acrylonitrile-styrene copolymer, ABS and α-methyl-styrene-styrene copolymer; vinyl resins such as polyvinyl chloride, polyvinylidene chloride, vinyl chloride-vinylidene chloride copolymer, methyl polyacrylate and methyl polymethacrylate; polyamide resins such as nylon 6, nylon 6-6, nylon 6-10, nylon 11 and nylon 12; polyester resins such as polyethylene terephthalate (PET), polybutylene terephthalate, polyethylene naphthalate and copolymerized polyesters thereof; polycarbonate resins; polyphenylene oxide resins; and biodegradable resins such as polylactic acid and the like. Of course, as long as the formability is not impaired, there can be used the blend of the thermoplastic resin thereof as the base resin (a). As long as the formability is not impaired, there can be used the blend of the above thermoplastic resin as the base resin (A).

For the use as a packaging material such as of containers, specifically, the polyester resin and the olefin resin can be preferably used since they can be formed at relatively low forming temperatures. Among them, the polyester resin is most desired since it causes the oxygen-absorbing component that will be described later to be thermally deteriorated little and makes it possible to secure a high gas-barrier property.

The polyester resin should have a molecular weight at least large enough for forming films. For instance, a thermoplastic resin having an intrinsic viscosity (I.V.) in a range of 0.6 to 1.40 dl/g and, specifically, 0.63 to 1.30 dl/g can be used as the base resin (A). Specifically, there can be used a thermoplastic resin that can be biaxially stretch-blow formed and crystallized, such as polyethylene terephthalate (PET), polybutylene terephthalate and polyethylene naphthalate, as well as a blend of these resins with polycarbonate or acrylate resin.

In the present invention, it is particularly desired to use the PET type polyester of the packaging grade of which not less than 60 mol % and, preferably, not less than 80 mol % of the ester recurring unit is an ethylene terephthalate unit. As described already, the PET type polyester of the packaging grade has a glass transition point (Tg) of as high as 50 to 90° C. and, specifically, 55 to 80° C. and a melting point (Tm) in a range of from about 200 to 275° C.

As the PET type thermoplastic polyester, a homopolyethylene terephthalate is best suited. However, a copolymerized polyester having a content of the ethylene terephthalate unit within the above range, too, can be preferably used.

In the copolymerized polyester, examples of the dibasic acid other than the terephthalic acid include aromatic dicarboxylic acids such as isophthalic acid, phthalic acid and naphthalenedicarboxylic acid; alicyclic dicarboxylic acids such as cyclohexanedicarboxylic acid and the like acid; aliphatic dicarboxylic acid such as succinic acid, adipic acid, sebacic acid and dodecanedioic acid, which can be used in one kind or in two or more kinds in combination. As the diol component other than the ethylene glycol, there can be used one or two or more of propylene glycol, 1,4-butanediol, diethylene glycol, 1.6-hexylene glycol, cyclohexanedimethanol and ethylene oxide adduct of bisphenol A.

The dibasic acid component stemming from the acid anhydride that is constituting the oxygen-absorbing component (B) described below can often be introduced by ester exchange or the like as a copolymerizable component into the PET type polyester.

<Oxygen-Absorbing Component (B)>

The present invention uses a compound having an unsaturated alicyclic structure as the oxygen-absorbing component (B) for absorbing oxygen. That is, if the compound having the unsaturated alicyclic structure comes in contact with oxygen, the unsaturatedly bonded portion in the ring is easily oxidized enabling oxygen to be absorbed, and thus the oxygen-absorbing capability is exhibited. This kind of to-be-oxidized property is not exhibited by the unsaturated bond in the aromatic ring.

If the unsaturated bond in the unsaturated alicyclic structure is oxidized, the ring is merely cleaved, but low molecular decomposed products (e.g., ketone and aldehyde) are not by-produced by oxidation. Therefore, use of the compound having the unsaturated alicyclic structure as the oxygen-absorbing component (B) gives such an advantage that no offensive odor generates when oxygen is absorbed and, therefore, there is no decrease in the property for retaining the flavor of the content in the container that is formed. That is, when the container is formed by using the oxygen-absorbing resin composition, the layer comprising the oxygen-absorbing resin composition can be arranged on the side where it comes in contact with the content in the container. Moreover, the container can be formed of only the layer of the oxygen-absorbing resin composition (i.e., single-layer structure). With the container being of the single-layer structure, in particular, the layer exhibits favorable oxygen-barrier property due to its excellent oxygen-absorbing capability. It is, therefore, allowed to decrease the thickness of the container wall which is very advantageous from the standpoint of reducing the weight of the container and saving resources.

As the compound having the unsaturated alicyclic structure (unsaturated alicyclically structured compound), the present invention uses methyltetrahydroindene, 5-ethylidene-2-norbornene, 5-methylene-2-norbornene, 5-isopropylidene-2-norbornene, 5-vinylidene-2-norbornene, 6-chloromethyl-5-isopropenyl-2-norbornene and dicyclopentadiene. Specifically, the invention preferably uses at least the one selected from the group consisting of an acid anhydride represented by the following formula (1),

[Chemical 6]

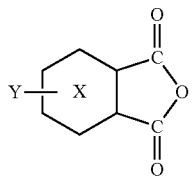

(1)

wherein the ring X is an aliphatic ring having an unsaturated bond, and Y is an alkyl group, an ester, an amide, an imide and a dicarboxylic acid derived from the acid anhydride, and a polymer having a constituent unit stemming from the acid anhydride.

In the above formula (1), it is desired that the aliphatic ring X is a 6-membered ring having an unsaturated bond, i.e., is a cyclohexene ring, and the position of the unsaturated bond may be either the third position or the fourth position but is, specifically, the third position from the standpoint of being oxidized. There is no specific limitation on the alkyl group, either. Usually, however, it is desired to use a lower alkyl group having not more than 3 carbon atoms and, specifically, a methyl group from the standpoint of synthesis and being oxidized, and the position where it is bonded may be, usually, either the third position or the fourth position. This acid anhydride is the alkyltetrahydrophthalic anhydride which is obtained by the Diels-Alder reaction of the maleic anhydride with the diene, is obtained in the form of a mixture of isomers, and is used in the form of the mixture as the oxygen-absorbing component (B).

In the present invention, the most preferred examples of the acid anhydride include a 3-methyl-$\Delta^4$-tetrahydrophthalic anhydride represented by the following formula (2) and a 4-methyl-$\Delta^3$-tetrahydrophthalic anhydride represented by the following formula (3),

[Chemical 7]

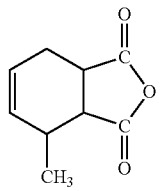

(2)

[Chemical 8]

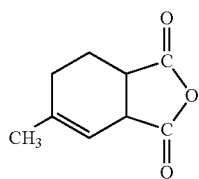

(3)

The above acid anhydride is capable of forming derivatives according to a method known per se. and so far as the unsaturated alicyclic structure is maintained, such derivatives can be used as the oxygen-absorbing component (B). Namely, the ester, amide, imide and dicarboxylic acid derived from the acid anhydride can be used as the oxygen-absorbing component (B).

The above ester is an ester obtained by reacting an acid anhydride such as alkyltetrahydrophthalic anhydride with various kinds of alcohols. There is no special limitation on the alcohol used for the esterification, and there can be used either an aliphatic alcohol such as methyl alcohol or ethyl alcohol or aromatic alcohol such as phenol or the like. It is, further, allowable to use a polyhydric alcohol such as glycol or the like. In this case, it is allowed to introduce unsaturated alicyclic structures of a number corresponding to the number of alcohols in a molecule.

Further, the ester may be a partial ester of the acid anhydride.

Namely, the ester is represented by the following formula,

R—O—OC—Z—CO—O—R

HOOC—Z—CO—O—R or

HOOC—Z—CO—O—R—O—CO—Z—COOH wherein Z is an unsaturated alicyclic ring possessed by the acid anhydride, and R is an organic group stemming from an alcohol used for the reaction.

The amide is obtained by the reaction of the acid anhydride such as alkyltetrahydrophthalic anhydride with various amine compounds.

There is no specific limitation on the amine that is used, and there can be used either an aliphatic amine such as methylamine, ethylamine or propylamine, or an aromatic amine such as phenylamine or the like. Namely, either one of the two carbonyl groups forming the acid anhydride may have been amidated or both of them may have been amidated. Not being limited to the monoamine, further, there can be used a polyvalent amine such as diamine or triamine. In this case, there can be introduced the unsaturated alicyclic structures in a number corresponding to the number of amines in a molecule.

Further, the imide is the one that is obtained by imidating the amide by the heat treatment and is, for example, obtained by heat-treating the amide represented by the following formula,

HOOC—Z—CONH—R or

HOOC—Z—CONH—R—CONH—Z—COOH wherein Z is an unsaturated alicyclic ring possessed by the acid anhydride, and R is an organic group stemming from an alcohol used for the reaction,
and is represented by the following formula,

Z—(CO)$_2$—N—R or

Z—(CO)$_2$—N—R—N—(CO)$_2$—Z wherein Z and R are as defined above.

The dicarboxylic acid is the acid anhydride that is hydrolyzed and of which the anhydrous acid group is cleaved, and is expressed by the following formula,

HOOC—Z—COOH wherein Z and R are as defined above.

Further, a polymer having a constituent unit stemming from the acid anhydride, too, can be used as the oxygen-absorbing component (B). Namely, the acid anhydride represented by the above formula (1) can be used as the dibasic acid component for forming a polyester. The copolymerized polyester has an unsaturated alicyclic structure in the molecular chain thereof, exhibits a predetermined oxygen-absorbing capability (oxidizability) and, therefore, can be used as the oxygen-absorbing component (B). Specifically, the copolymerized polyester has a very high affinity to the polyester resin used as the base resin (A) and is very favorable for homogeneously dispersing the oxygen-absorbing component (B).

The dibasic acid used for producing the copolymerized polyester that serves as the oxygen-absorbing component (B), can be represented by terephthalic acid, isophthalic acid, succinic acid and adipic acid. These acids together with the above acid anhydride are polycondensed with the diol component to produce the copolymerized polyester. In this case, the diol component can be represented by, for example, 1,4-butanediol, ethylene glycol, 1,6-hexanediol and neopentyl glycol.

In the copolymerized polymer, it is desired that the amount of the acid anhydride is in a range of 30 to 90 mol % and, specifically, 50 to 80 mol % per the whole dibasic acid. If the amount of the constituent unit stemming from the acid anhydride is small in the copolymerized polymer, the oxygen-absorbing capability becomes poor, and the copolymerized polymer must be added in large amounts to the polyester resin composition. As a result, it becomes necessary to add the oxidation promotion component (C) that will be described later in large amounts, too, impairing, however, excellent properties of the thermoplastic resin (specifically, polyester resin) that is used as the base resin (A). For example, it becomes difficult to carry out the blow forming and, therefore, it may become difficult to form the containers. Further, a too large amount of the constituent unit stemming from the acid anhydride impairs such an advantage that the copolymerized polyester that is obtained exhibits a high affinity to the polyester resin that is used as the base resin (A). That is, the properties become very different from the properties of the polyester resin (e.g., PET) that is used as the base resin, making it difficult to homogeneously disperse the copolymerized polyester (oxygen-absorbing component (B)) and causing the forming to become defective.

The copolymerized polyester having a number average molecular weight of, usually, about 1,000 to 1,000,000 can be favorably used as the oxygen-absorbing component (B).

Among the above-mentioned various acid anhydride derivatives, the invention preferably uses those of low molecular weights, e.g., derivatives having molecular weights of not more than 2000 from the standpoint of transparency.

In the invention, the amount of use of the oxygen-absorbing component (B) is so set as to attain sufficient oxygen-absorbing capability without impairing properties such as formability and the like of the thermoplastic resin such as polyester resin used as the base resin (A). The amount thereof varies depending upon the embodiments and cannot be definitely specified but is, usually, in a range of 0.1 to 20 parts by weight and, specifically, 0.5 to 5 parts by weight calculated as the acid anhydride represented by the above formula (1) per 100 parts by weight of the base resin (A).

<Oxidation Promotion Component (C)>

As the oxidation promotion component (C), use is made of a compound having benzyl hydrogen. The benzyl hydrogen can be easily pulled out during, for example, the step of melt-kneading, undergoes the reaction with oxygen to form a radical that difficulty undergoes the reaction. Thus, the source of radicals is formed producing radicals of the oxygen-absorbing component (B) and promoting the oxidation of the oxygen-absorbing component (B) when it comes in contact with oxygen.

Namely, use of the component (C) promotes the oxidation of the oxygen-absorbing component (B) as compared to when no transition metal catalyst is used and, further, promotes the oxidation of the oxygen-absorbing component (B) even under the conditions where the base resin (A) has a high glass transition temperature and mobility of the molecules is suppressed at room temperature, making it possible to secure excellent oxygen-barrier property.

There is no special limitation on the above compound provided it has benzyl hydrogen, i.e., a hydrogen atom bonded to the benzyl position of a benzyl group. Usually, however, it is desired that the compound is in the form of a polymer from such a standpoint that it can be easily dispersed in the resin composition that contains the base resin (A). Concretely, a polymer having, as a constituent unit, a styrene with benzyl hydrogen, can be preferably used as the oxidation promotion component (C).

As the styrene polymer, there can be exemplified polystyrene, acrylonitrile-styrene copolymer, α-methyl styrene-styrene copolymer and styrene-diene copolymer. As the styrene-diene copolymer, further, there can be preferably used styrene-isoprene block copolymer, styrene-isoprene-styrene triblock copolymer, styrene-butadiene block copolymer and styrene-butadiene-styrene triblock copolymer, as well as hydrogenated styrene-diene copolymer.

Among the above styrene polymers, the invention preferably uses a styrenic polymer containing much benzyl hydrogen, such as polystyrene as well as styrene polymers containing a styrene block in amounts of not less than 15 mol %, as a matter of course.

Preferably, further, the styrene polymer has, usually, a number average molecular weight in a range of 1,000 to 1,000,000 from the standpoint of dispersion property and the like properties.

It is desired that the oxidation promotion component (C) is used in such an amount that the amount of the styrene block having benzyl hydrogen is from 0.1 to 30 parts by weight and, specifically, from 0.5 to 5 parts by weight per 100 parts by weight of the oxygen-absorbing component (B) that is calculated as the acid anhydride as described above from the standpoint of maintaining excellent oxygen-absorbing capability without impairing formability of the base resin (A).

<Other Blending Agents>

The oxygen-absorbing resin composition of the present invention containing the above-mentioned components (A) to (C) can be suitably blended with any known blending agents depending on the use.

To further improve the oxygen-absorbing capability, for example, there can be added a transition metal catalyst that has been commonly used for the compositions of this kind.

Representative examples of the transition metal used for the transition metal catalyst of this kind include iron, cobalt, nickel, copper, silver, tin, titanium, zirconium, vanadium, chromium and manganese. Of them, cobalt is best desired for promoting the oxidation of the oxygen-absorbing component (B) and for improving the oxygen-absorbing capability. The catalysts of these transition metals are, usually, used in the form of low-valence inorganic salts of the transition metals, organic salts thereof or complexes thereof. Their concrete forms have been known as closely described in, for example, JP-A-2004-161796.

Use of the transition metal catalyst is often accompanied by such inconveniences as oxidation and deterioration of the base resin (A), a resulting decrease in the strength thereof, a decrease in the oxygen-barrier property as well as by-production of low-molecular decomposed products that could become a cause of offensive odor. Therefore, use thereof should be limited to such applications in which the above inconveniences can be neglected. Even if used, the amounts thereof should be limited as much as possible. For instance, the amount of the transition metal catalyst should not be more than 1,000 ppm and, specifically, not more than 400 ppm calculated as metal per the resin composition. Most desirably, the transition metal catalyst should not be added at all, as a matter of course.

Further, the resin composition of the present invention can be blended with a known gas-barrier resin. Namely, the resin composition containing the above oxygen-absorbing component (B) and the oxidation promotion component (C) has a function for improving the barrier property against oxygen upon absorbing oxygen by oxidation, but its barrier property against oxygen decreases with the passage of time. Use of the gas-barrier resin, therefore, is desired from the standpoint of effectively avoiding the above inconveniences and improving life of the oxygen-barrier property. Use of the gas-barrier resin is, further, advantageous for improving barrier property against other gases (e.g., water vapor, carbonic acid gas, etc.).

Representative examples of the gas-barrier resin include polyamide resins such as nylon 6, nylon 6.6, nylon 6/6.6 copolymer, polymetaxylenediadipamide (MXD6), nylon 6.10, nylon 11, nylon 12 and nylon 13. Among these polyamides, a polymetaxylenediadipamide having terminal amino groups in an amount of not less than 40 eq/$10^6$ g and, specifically, not less than 50 eq/$10^6$ g has a large resistance against being oxidized and deteriorated, and is desirable.

Further, a representative example of the gas-barrier resin other than the polyamide resin is an ethylene-vinyl alcohol copolymer. For example, there can be preferably used a saponified copolymer that is obtained by so saponifying an ethylene-vinyl acetate copolymer having an ethylene content of 20 to 60 mol % and, specifically, 25 to 50 mol % that the saponification degree thereof is not less than 96% and, specifically, not less than 99 mol %.

The above gas-barrier resin should have a molecular weight large enough for forming films.

Further, the resin composition of the invention can be suitably blended with various blending agents such as filler, coloring agent, heat stabilizer, aging stabilizer, antioxidant, anti-aging agent, photo stabilizer, ultraviolet ray absorber, antistatic agent, lubricant like metal soap or wax, and reforming resin or rubber within ranges in which they do not impair excellent oxygen-absorbing capability and formability of the resin composition.

<Preparation of the Oxygen-Absorbing Resin Composition and Use>

The above-mentioned oxygen-absorbing resin composition is, usually, prepared by kneading the above-mentioned components in a non-oxidizing atmosphere by using an extruder or the like but can also be prepared by employing such means as mixing some of the components in advance and subsequently mixing the rest of the components thereto.

For example, part of the thermoplastic resin which is the base resin (A) is melt-kneaded together with the oxygen-absorbing component (B) and the oxidation promotion component (C) by using a twin screw extruder while conducting the deaeration to prepare pellets of the master batch thereof, and the rest of the thermoplastic resin is kneaded together therewith for being formed just prior to the use. In this case, the thermoplastic resin (base resin (A)) for preparing the master batch and the thermoplastic resin (base resin (A)) subsequently kneaded together therewith may have properties different from each other. By employing this means, it is allowed to adjust the properties depending upon the use.

When the transition metal catalyst is to be used, further, it is desired that the transition metal catalyst is dissolved in a suitable organic solvent (organic solvent of the type of, for example, alcohol, ether, ketone or hydrocarbon) to prepare a solution thereof which is then mixed with other components in a kneader such as extruder so that the transition metal catalyst is homogeneously mixed therein.

The oxygen-absorbing resin composition of the invention excels in oxygen-absorbing capability without by-producing low molecular decomposed products that could become a cause of offensive odor upon absorbing oxygen, and is very suited for use in the field of packaging materials preventing the contents from being deteriorated by oxidation and without impairing the flavor. The oxygen-absorbing resin composition of the invention is favorably used as packaging materials in the forms of, for example, film, sheet, cup, tray, bottle, tube and lid. The oxygen-absorbing resin composition can also be used in the forms of powder, film, sheet and the like to absorb oxygen in the sealed packaging containers.

The oxygen-absorbing resin composition of the invention does not by-produce any low molecular decomposed product that could become a cause of offensive odor upon absorbing oxygen. When used for forming the packaging containers such as bag, cup, bottle, tube and the like, further, the layer comprising the resin composition can be positioned on the side where it comes in contact with the content in the container. Namely, it is allowable to form the packaging containers comprising the layer of the resin composition only.

By utilizing its excellent oxygen-barrier property of the layer of the resin composition based on the absorption of oxygen, it is allowed to decrease the thickness of the walls of the packaging containers of the single-layer structure and, therefore, to reduce the weight of the containers, reduce the resources and to lower the cost thereof.

The above packaging containers may be formed relying upon the means that has been known per se.; i.e., the resin composition is formed into a film by, for example, extrusion forming, and the film is stuck together by heat-sealing to obtain a bag-like container. Further, a preform of the shape of a sheet or test tube is formed by extrusion forming or injection forming, and is subjected to the secondary forming such as vacuum forming, expansion forming, compressed air forming, plug-assist forming or blow stretching to obtain a packaging container of the shape of cup, tray or bottle. Further, a packaging container of the tubular shape can be directly obtained relying on the extrusion forming, injection forming or direct blow forming.

Upon being combined with other resins or resin compositions, further, the oxygen-absorbing resin composition of the invention can be formed into a packaging container of a multilayer structure. Upon being multilayered, it is allowed not only to further improve barrier property against oxygen but also to improve barrier property against gases (e.g., carbonic acid gas and water vapor) in addition to oxygen and to maintain the oxygen-absorbing capability for extended periods of time.

Described below are examples of the multilayer structure.

The layer constitutions are represented by the following abbreviations.

OAR: Oxygen-absorbing layer formed by using the oxygen-absorbing resin composition of the invention.
PET: Polyethylene terephthalate layer.
PE: Layer of a low-, intermediate- or high-density polyethylene, straight chain low-density polyethylene or linear very-low-density polyethylene.
PP: Polypropylene layer.
COC: Layer of an annular olefin resin.
GBAR: Gas-barrier layer of an aromatic polyamide or an ethylene vinyl alcohol copolymer.

Two-Layer Structure:
PET/OAR

Three-Layer Structures:
PE/OAR/PET
PET/OAR/PET
GBAR/OAR/PET
PE/OAR/COC

Four-Layer Structures:
PE/PET/OAR/PET
PE/OAR/GBAR/PET
PET/OAR/GBAR/PET
PE/OAR/GBAR/COC
PE/OAR/GBAR/PE Five-Layer Structures:
PET/OAR/PET/OAR/PET
PE/PET/OAR/GBAR/PET
PET/OAR/GBAR/COC/PET
PET/OAR/PET/COC/PET
PE/OAR/GBAR/COC/PET
PE/GBAR/OAR/GBAR/PE
PP/GBAR/OAR/GBAR/PP Six-Layer Structure:
PET/OAR/PET/OAR/GBAR/PET
PE/PET/OAR/COC/GBAR/PET
PET/OAR/GBAR/PET/COC/PET
PE/GBAR/OAR/PE/GBAR/PE
PP/EVOH/OAR/PP/GBAR/PP Seven-Layer Structure:
PET/OAR/COC/PET/GBAR/OAR/PET In the above multilayer structure, an embodiment that includes the gas-barrier resin layer (GBAR) is desired from the standpoint of maintaining the oxygen-absorbing capability of the oxygen-absorbing layer (OAR) for extended periods of time.

In the above multilayer structure, further, either side thereof may be on the inner surface side or on the outer surface side of the container.

Further, if adhesiveness is not enough among the layers, a layer of an adhesive resin such as olefin resin modified with an unsaturated carboxylic acid may be interposed among the layers.

By utilizing the multiplication of layers based on the co-extrusion or the co-injection, the packaging containers of the multilayer structures are produced by conducting the forming in the same manner as in forming the single-layer structure mentioned above.

Owing to its excellent oxygen-absorbing property, the packaging container provided with the layer of the oxygen-absorbing resin composition of the invention exhibits excellent oxygen-barrier property, and is very suited, irrespective of if it has the single-layer structure or the multilayer structure, for containing various kinds of contents that are subject to be deteriorated by the presence of oxygen, such as beverages like beer, wine, fruits juice, carbonated soft drinks, as well as fruits, nuts, vegetables, meat products, infant's foods, coffee, jam, mayonnaise, ketchup, edible oils, dressings, sauces, food boiled down in soy, milk products, pharmaceuticals, cosmetics, gasoline and the like.

Because of its excellent transparency, further, the packaging container of the invention can also be favorably used in a field where transparency is required.

EXAMPLES

The invention will now be described by way of the following Examples to which only, however, the invention is in no way limited.

1. Materials

Described below are the materials used in the Examples.

<Base Resin (A)>
(A1): Polyethylene terephthalate resin containing cyclohexanedimethanol (S2008: manufactured by SK Chemical Co.).
(A2): Polymetaxylenediadipamide (T-620: manufactured by Toyobo Co.).

<Oxygen-Absorbing Component (B)>
(B1): A mixture of methyltetrahydrophthalic anhydrides containing 45% by weight of a 4-methyl-Δ3-tetrahydrophthalic anhydride and 21% by weight of a cis-3-methyl-Δ4-tetrahydrophthalic anhydride (HN-2200: manufactured by Hitachi Kasei Co.).

<Oxidation Promotion Components (C)>
(C1): Polystyrene resin (Toyo Styrol GPHRM48N: manufactured by Toyo Styrene Co.).
(C2): Hydrogenated styrene-butadiene-styrene triblock copolymer resin (Toughtech P2000: manufactured by Asahi Kasei Chemicals Co.).

<Transition Metal Catalyst>
Transition metal catalyst 1: cobalt neodecanoate (DICNATE 5000: manufactured by Dainihon Ink Kagaku Kogyo Co.).

2. Synthesis of the Oxygen-Absorbing Component.

Synthesis Example 1

Into a 300-ml separable flask equipped with a stirrer, a nitrogen introduction pipe and the Dean-Stark type water separator, there were fed 50 g of a methyltetrahydrophthalic anhydride containing 45% by weight of a 4-methyl-Δ3-tetrahydrophthalic anhydride (HN-2200: manufactured by Hitachi Kasei Co.) as the oxygen-absorbing component and 72.5 g of a stearylamine (manufactured by Tokyo Kasei Kogyo Co.) as the amine component, and the reaction was conducted for about 6 hours in a nitrogen atmosphere at 120° C. to 180° C. while removing water that was formed. From the IR spectrum of the obtained reaction solution, the synthesis was confirmed relying on the disappearance of a peak at 1780 $cm^{-1}$ stemming from the methyltetrahydrophthalic anhydride and on the appearance of a peak at 1708 $cm^{-1}$ stemming from the imide group of the synthesized product. The synthesized product was regarded to be an oxygen-absorbing component (B2).

Synthesis Example 2

The synthesis was conducted in the same manner as in Synthesis Example 1 but using 18.4 g of a metaxylenediamine (manufactured by Tokyo Kasei Kogyo Co.) as the amine component to obtain an oxygen-absorbing component (B3).

3. Preparation of the Oxygen-Absorbing Resin Pellets.

By using a twin screw extruder equipped with a granulating facility (TEM-35B: manufactured by Toshiba Kikai Co.) with its barrel being set at a temperature of 200° C., the base resin A was mixed with various constituent components, and the mixture thereof was extruded in a stranded manner to obtain the resin composition pellets thereof. The constituent components were introduced in such a manner that the solid pellets were dry-blended with the polyester resin, and the liquid components were added through an opening formed in the way of the extruder by using a liquid feeder (NEMO pump: manufactured by Heishin Sobi Co.).

4. Method of Measuring the Amounts of Oxygen Absorbed by the Resin Compositions.

Various kinds of resin composition pellets were pulverized by using a freeze-pulverizer and their amounts were measured. Thereafter, the resin composition pellets were put into an oxygen-impermeable container [Hiretoflex: cup-like container of laminated layers of polypropylene/steel foil/polypropylene manufactured by Toyo Seikan Co.] of a capacity of 58 ml. The container was, then, heat-sealed with a lid member of polypropylene (inner layer)/aluminum foil/polyester (outer layer), and the resin composition pellets were preserved therein under the conditions of 23° C., 50° C. and 80° C. By using a micro gas chromatography (M200: manufactured by Agilent Technologies Co.), the oxygen concentration in the container was measured with the passage of time, and the amount of oxygen absorbed (cc/g) was calculated.

Example 1

The base resin A1 was blended with 1% by weight of the oxygen-absorbing component B1 and 10% by weight of the oxidation promotion component C1 to prepare resin composition pellets thereof according to the method mentioned above, and the amount of oxygen absorbed by the resin composition (cc/g) was calculated. The result was as shown in Table 1.

Example 2

The base resin A1 was blended with 1% by weight of the oxygen-absorbing component B1 and 20% by weight of the oxidation promotion component C1 to prepare resin composition pellets thereof according to the method mentioned above, and the amount of oxygen absorbed by the resin composition (cc/g) was calculated. The result was as shown in Table 1.

Example 3

The base resin A1 was blended with 1% by weight of the oxygen-absorbing component B1 and 20% by weight of the oxidation promotion component C2 to prepare resin composition pellets thereof according to the method mentioned above, and the amount of oxygen absorbed by the resin composition (cc/g) was calculated. The result was as shown in Table 1.

Example 4

The base resin A1 was blended with 1% by weight of the oxygen-absorbing component B1, 20% by weight of the oxidation promotion component C2 and 0.035% by weight (350 ppm) of the transition metal catalyst 1 calculated as metal to prepare resin composition pellets thereof according to the method mentioned above, and the amount of oxygen absorbed by the resin composition (cc/g) was calculated. The result was as shown in Table 1.

Example 5

The base resin A1 was blended with 10% by weight of the oxygen-absorbing component B2 and 10% by weight of the oxidation promotion component C1 to prepare resin composition pellets thereof according to the method mentioned above, and the amount of oxygen absorbed by the resin composition (cc/g) was calculated. The result was as shown in Table 2.

Example 6

The base resin A1 was blended with 10% by weight of the oxygen-absorbing component B2 and 10% by weight of the oxidation promotion component C2 to prepare resin composition pellets thereof according to the method mentioned above, and the amount of oxygen absorbed by the resin composition (cc/g) was calculated. The result was as shown in Table 2.

Example 7

The base resin A1 was blended with 10% by weight of the oxygen-absorbing component B3 and 10% by weight of the oxidation promotion component C1 to prepare resin composition pellets thereof according to the method mentioned above, and the amount of oxygen absorbed by the resin composition (cc/g) was calculated. The result was as shown in Table 2.

Example 8

The base resin A2 was blended with 10% by weight of the oxygen-absorbing component B2 and 10% by weight of the oxidation promotion component C1 to prepare resin composition pellets thereof according to the method mentioned above, and the amount of oxygen absorbed by the resin composition (cc/g) was calculated. The result was as shown in Table 2.

Comparative Example 1

The base resin A1 was blended with 1% by weight of the oxygen-absorbing component B1 to prepare resin composition pellets thereof according to the method mentioned above, and the amount of oxygen absorbed by the resin composition (cc/g) was calculated. The result was as shown in Table 1.

Comparative Example 2

The base resin A1 was blended with 10% by weight of the oxygen promotion component C1 to prepare resin composition pellets thereof according to the method mentioned above, and the amount of oxygen absorbed by the resin composition (cc/g) was calculated. The result was as shown in Table 1.

Comparative Example 3

The base resin A1 was blended with 10% by weight of the oxygen-absorbing component B2 to prepare resin composition pellets thereof according to the method mentioned above, and the amount of oxygen absorbed by the resin composition (cc/g) was calculated. The result was as shown in Table 2.

Comparative Example 4

The base resin A1 was blended with 10% by weight of the oxygen-absorbing component B3 to prepare resin composition pellets thereof according to the method mentioned above, and the amount of oxygen absorbed by the resin composition (cc/g) was calculated. The result was as shown in Table 2.

Comparative Example 5

The base resin A1 was blended with 10% by weight of the oxygen promotion component C2 to prepare resin composition pellets thereof according to the method mentioned above, and the amount of oxygen absorbed by the resin composition (cc/g) was calculated. The result was as shown in Table 2.

Comparative Example 6

The base resin A2 was blended with 10% by weight of the oxygen-absorbing component B2 to prepare resin composition pellets thereof according to the method mentioned above, and the amount of oxygen absorbed by the resin composition (cc/g) was calculated. The result was as shown in Table 2.

TABLE 1

| | Base resin (A) | Oxygen-absorbing component (B) | | Oxidation promotion component (c) | | Transition metal catalyst | | Oxygen absorption (cc/g) 80° C., 7 days |
|---|---|---|---|---|---|---|---|---|
| | | Chemical species | Amount (wt %) | Chemical species | Amount (wt %) | Chemical species | Amount (ppm as metal) | |
| Ex. 1 | A1 | B1 | 1 | C1 | 10 | none | | 0.3 |
| Ex. 2 | A1 | B1 | 1 | C1 | 20 | none | | 0.5 |
| Ex. 3 | A1 | B1 | 1 | C2 | 20 | none | | 0.9 |
| Ex. 4 | A1 | B1 | 1 | C2 | 20 | *1 | 350 | 1.5 |
| Comp. Ex. 1 | A1 | B1 | 1 | none | | none | | 0.13 |
| Comp. Ex. 2 | A1 | none | | C1 | 10 | none | | 0 |

*1: transition metal catalyst 1

TABLE 2

| | Base resin (A) | Oxygen-absorbing component (B) | | Oxidation promotion component (c) | | Transition metal catalyst | | *1 | *2 |
|---|---|---|---|---|---|---|---|---|---|
| | | Chemical species | Amount (wt %) | Chemical species | Amount (wt %) | Chemical species | Amount (ppm as metal) | | |
| Ex. 5 | A1 | B2 | 10 | C1 | 10 | none | | 0.052 | 1.345 |
| Ex. 6 | A1 | B2 | 10 | C2 | 10 | none | | 0.025 | 6.444 |
| Ex. 7 | A1 | B3 | 10 | C1 | 10 | none | | 0.107 | 0.420 |
| Ex. 8 | A2 | B2 | 10 | C1 | 10 | none | | 0.170 | 0.255 |
| Comp. Ex. 3 | A1 | B2 | 10 | none | | none | | 0.031 | 0.695 |
| Comp. Ex. 4 | A1 | B3 | 10 | none | | none | | 0.022 | 0.140 |
| Comp. Ex. 5 | A1 | none | | C2 | 10 | none | | 0.012 | 0.023 |

TABLE 2-continued

| | Base resin (A) | Oxygen-absorbing component (B) | | Oxidation promotion component (c) | | Transition metal catalyst | | *1 | *2 |
|---|---|---|---|---|---|---|---|---|---|
| | | Chemical species | Amount (wt %) | Chemical species | Amount (wt %) | Chemical species | Amount (ppm as metal) | | |
| Comp. Ex. 6 | A2 | B2 | 10 | none | | none | | 0.113 | 0.127 |

*1: Oxygen absorption (cc/g) 23° C., 7 days
*2: Oxygen absorption (cc/g) 50° C., 7 days

The invention claimed is:

1. A packaging container having, formed in the wall thereof, at least one layer that comprises an oxygen-absorbing resin composition including
a base resin (A) which is a polyester resin,
an oxygen-absorbing component (B) which is a compound having an unsaturated alicyclic structure, and
an oxidation promotion component (C) for promoting the oxidation of said oxygen-absorbing component (B), said oxidation promotion component (C) being a styrenic polymer,
wherein the oxygen-absorbing component (B) is an imide-derivative having a molecular weight of not more than 2000 obtained by reacting an aliphatic amine with an acid anhydride represented by the following formula (1),

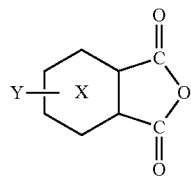

(1)

wherein the ring X is an aliphatic ring having an unsaturated bond, and Y is an alkyl group;

wherein the aliphatic amine has no aromatic ring;

wherein said styrenic polymer is used in such an amount that the styrene units contained in the styrenic polymer are present in an amount of from 0.1 to 30 parts by weight per 100 parts by weight of the oxygen-absorbing component (B).

2. The packaging container according to claim 1, wherein the layer that comprises said oxygen-absorbing resin composition is formed at a position where it comes in contact with the content in the container.

3. The packaging container according to claim 2, wherein the container wall consists of only a single layer of said oxygen-absorbing resin composition.

* * * * *